(12) United States Patent
Park et al.

(10) Patent No.: US 12,244,040 B2
(45) Date of Patent: Mar. 4, 2025

(54) SECONDARY BATTERY

(71) Applicant: Samsung SDI Co., Ltd., Yongin-si (KR)

(72) Inventors: Jong Jun Park, Yongin-si (KR); Dae Kyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 48 days.

(21) Appl. No.: 17/733,046

(22) Filed: Apr. 29, 2022

(65) Prior Publication Data

US 2022/0359962 A1  Nov. 10, 2022

(30) Foreign Application Priority Data

May 6, 2021 (KR) .................. 10-2021-0058745

(51) Int. Cl.
*H01M 50/578* (2021.01)
*H01M 10/0587* (2010.01)
*H01M 50/107* (2021.01)
*H01M 50/30* (2021.01)

(52) U.S. Cl.
CPC ..... *H01M 50/578* (2021.01); *H01M 10/0587* (2013.01); *H01M 50/107* (2021.01); *H01M 50/30* (2021.01)

(58) Field of Classification Search
None
See application file for complete search history.

(56) References Cited

U.S. PATENT DOCUMENTS

| | | | |
|---|---|---|---|
| 5,853,912 A | 12/1998 | Naing et al. | |
| 6,183,905 B1* | 2/2001 | Ling | H01M 50/172 429/178 |
| 10,333,133 B2 | 6/2019 | Park et al. | |
| 2011/0104523 A1* | 5/2011 | Lee | H01M 10/02 429/7 |
| 2017/0133645 A1* | 5/2017 | Miyata | H01M 50/119 |
| 2017/0207439 A1 | 7/2017 | Park et al. | |
| 2020/0091482 A1* | 3/2020 | Min | H01M 50/184 |
| 2020/0259202 A1 | 8/2020 | Haraguchi et al. | |

(Continued)

FOREIGN PATENT DOCUMENTS

| | | |
|---|---|---|
| JP | 2006-286561 A | 10/2006 |
| KR | 10-2006-0010941 A | 2/2006 |

(Continued)

OTHER PUBLICATIONS

Extended European Search Report dated Sep. 29, 2022 issued in corresponding European Patent Application No. 22171889.3 (9 pages).

*Primary Examiner* — Alix E Eggerding
(74) *Attorney, Agent, or Firm* — Womble Bond Dickinson (US) LLP

(57) ABSTRACT

A secondary battery includes: a cylindrical case; an electrode assembly accommodated in the cylindrical case and wound in a cylindrical shape; and a current interrupt device electrically connected to the electrode assembly and sealing the cylindrical case. The current interrupt device includes a cap-down electrically connected to the electrode assembly, a safety vent electrically connected to the cap-down, and an insulating gasket between the cap-down and the safety vent and covering outer circumferences of the cap-down and the safety vent.

10 Claims, 3 Drawing Sheets

(56) References Cited

U.S. PATENT DOCUMENTS

2021/0273288 A1 9/2021 Wang et al.
2023/0087398 A1* 3/2023 Park ..................... H01M 50/30
　　　　　　　　　　　　　　　　　　　429/53

FOREIGN PATENT DOCUMENTS

KR　　　　10-1184970　　　10/2012
KR　　10-2018-0127721 A　　11/2018
WO　　WO 2020/010453 A1　　1/2020

* cited by examiner

SECONDARY BATTERY

CROSS-REFERENCE TO RELATED APPLICATION

This application claims priority to and the benefit of Korean Patent Application No. 10-2021-0058745, filed on May 6, 2021 in the Korean Intellectual Property Office, the entire content of which is herein incorporated by reference.

BACKGROUND

1. Field

Aspects of embodiments of the present disclosure relate to a secondary battery.

2. Description of the Related Art

Lithium ion secondary batteries are widely used, for example, as power sources for hybrid vehicles or electric vehicles, as well as for portable electronic devices, due to certain characteristics having a high operation voltage and a high energy density per unit weight.

The secondary batteries can be classified as a cylindrical type, a prismatic type, or a pouch type depending on the shapes. In an example, the secondary battery generally includes: a cylindrical can; a cylindrical electrode assembly coupled to the can; an electrolyte optionally injected into the can so as to allow lithium ions to move; and a cap assembly (or referred to as a current interrupt device (CID)) which is coupled to a side of the can to prevent or substantially prevent leakage of the electrolyte and which may prevent separation of the electrode assembly.

The above information disclosed in this section of "Description of the Related Art" is provided for enhancement of understanding of the background of the present invention, and, therefore, it may contain information that does not form the related art.

SUMMARY

According to an aspect of one or more embodiments of the present disclosure, a secondary battery is capable of: preventing or substantially preventing leakage of an electrolyte while simplifying a structure of a current interrupt device; preventing or substantially preventing a deformation of the current interrupt device; and preventing or substantially preventing a short circuit between a can and the current interrupt device due to a high heat deflection temperature.

According to one or more embodiments, a secondary battery includes: a cylindrical case; an electrode assembly accommodated in the cylindrical case and wound in a cylindrical shape; and a current interrupt device electrically connected to the electrode assembly and sealing the cylindrical case, wherein the current interrupt device includes a cap-down electrically connected to the electrode assembly, a safety vent electrically connected to the cap-down, and an insulating gasket between the cap-down and the safety vent and covering outer circumferences of the cap-down and the safety vent.

Accordingly, the insulating gasket of the current interrupt device according to embodiments of the present disclosure concurrently (e.g., simultaneously) achieves the insulating function and sealing function. Thus, the number of components is reduced, and sealing strength is enhanced.

In one or more embodiments, the insulating gasket may include: an interposing portion between the cap-down and the safety vent; an upward extension portion extending from the interposing portion and covering the outer circumference of the safety vent; an upper horizontal portion extending from the upward extension portion and covering an upper surface of the safety vent; and a downward extension portion extending from the interposing portion and covering the outer circumference of the cap-down.

Accordingly, the insulating gasket of the current interrupt device according to embodiments of the present disclosure may be provided in the form of a single body that includes the interposing portion, the upward extension portion, the upper horizontal portion, and the downward extension portion. Thus, a number of components may be reduced.

In one or more embodiments, the safety vent may include a first flat portion, a second flat portion extending from the first flat portion, and a third flat portion extending from the second flat portion, wherein the interposer is in close contact with an entire lower surface of the third flat portion. In one or more embodiments, a width of the downward extension portion may be greater than a thickness of the interposing portion.

Accordingly, the interposing portion of the insulating gasket of the current interrupt device according to embodiments of the present disclosure is in close contact with the entire lower surface of the third flat portion of the safety vent. Thus, an insulating function between the safety vent and the cap-down is enhanced, and deformation of the insulating gasket is prevented or substantially prevented.

In one or more embodiments, the secondary battery may further include an upper tar-coated layer between an upper surface of the interposing portion and a lower surface of the safety vent, and a lower tar-coated layer between a lower surface of the interposing portion and an upper surface of the cap-down.

Accordingly, the tar-coated layers may be further provided on the insulating gasket of the current interrupt device according to embodiments of the present disclosure. Thus, a sealing strength of the secondary battery may be enhanced.

In one or more embodiments, the insulating gasket may include polyethylene which is naturally cross-linked at room temperature (about 1° C. to about 35° C.). A thickness of the insulating gasket may not be changed before and after the crosslinking, and a heat deflection temperature may be about 400° C. to about 600° C.

Accordingly, the insulating gasket of the current interrupt device according to embodiments of the present disclosure is not deformed (for example, not contracted) even after the secondary battery is manufactured. In addition, the insulating gasket is not melted at high temperature, thus preventing or substantially preventing a short circuit between the case and the safety vent.

BRIEF DESCRIPTION OF THE DRAWINGS

The accompanying drawings are included to provide a further understanding of the present disclosure, and are incorporated in and constitute a part of this specification. The drawings illustrate some example embodiments of the present disclosure and, together with the description, serve to explain principles of the present disclosure. In the drawings.

DETAILED DESCRIPTION

Figure 1A:
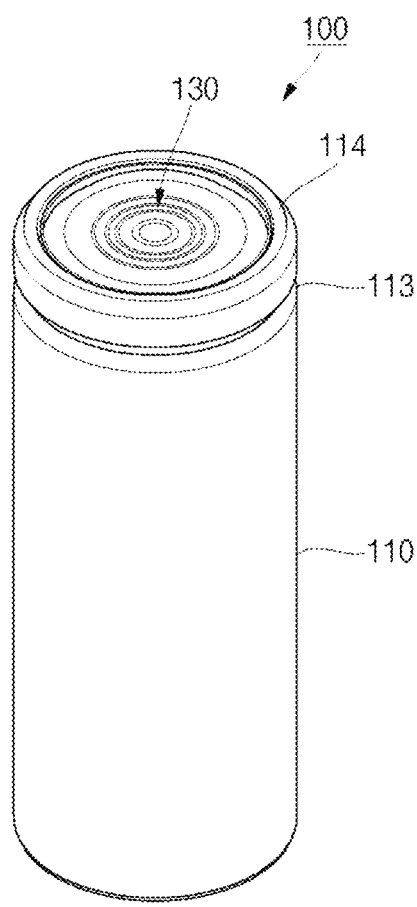
FIGS. 1A and 1B are a perspective view and a cross-sectional view, respectively, illustrating a secondary battery according to an embodiment of the present disclosure.

Herein, some embodiments of the present invention will be described in further detail with reference to the accompanying drawings.

The present disclosure is provided to more fully describe embodiments of the present invention to those skilled in the art. The following embodiments may be modified in many different forms, and the scope of the present invention is not limited to the following embodiments. Rather, these embodiments are provided so that this disclosure will be thorough and complete, and will fully convey the concept of the present invention to those skilled in the art.

Also, in the drawings, the thickness and size of each layer may be exaggerated for convenience and clarity of illustration, and like reference numerals refer to like elements throughout. As used in this specification, the term "and/or" may include any and all combinations of one or more of the associated listed items. Also, in this specification, it is to be understood that when a member A is referred to as being "connected to" a member B, the member A may be directly connected to the member B, or one or more members C may be interposed between the members A and B such that the member A is indirectly connected to the member B.

The terms used herein are for the purpose of describing various embodiments and are not intended to limit the present invention. As used in this specification, a singular form may, unless definitely indicating a particular case in terms of the context, include a plural form. Also, it is to be further understood that the terms "comprise" or "include" and/or "comprising" or "including," when used in this specification, specify the presence of stated features, numbers, steps, operations, members, elements, and/or groups thereof, but do not preclude the presence or addition of one or more other features, numbers, steps, operations, members, elements, and/or groups thereof.

In the specification, although the terms "first," "second," etc. may be used to describe various members, components, regions, layers, and/or portions, these members, components, regions, layers, and/or portions are not to be limited by these terms. These terms are used to distinguish one member, component, region, layer, or portion from another member, component, region, layer, or portion. Thus, a first member, component, region, layer, or portion, described below may also refer to a second member, component, region, layer, or portion, without departing from the teachings of the present invention.

Spatially relative terms, such as "beneath," "below," "lower," "above," "upper," may be used herein for easy understanding of one element or feature and another element(s) or feature(s) as illustrated in the drawings. These spatially relative terms are intended for ease of comprehension of the present invention according to various process states or usage states of the present invention, and, thus, the present invention is not limited thereto. For example, when an element or feature in the drawings is turned over, the element or feature described as "beneath" or "below" may be changed into "above" or "upper." Thus, the term "below" may encompass the term "above" or "below."

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Figure 1B:
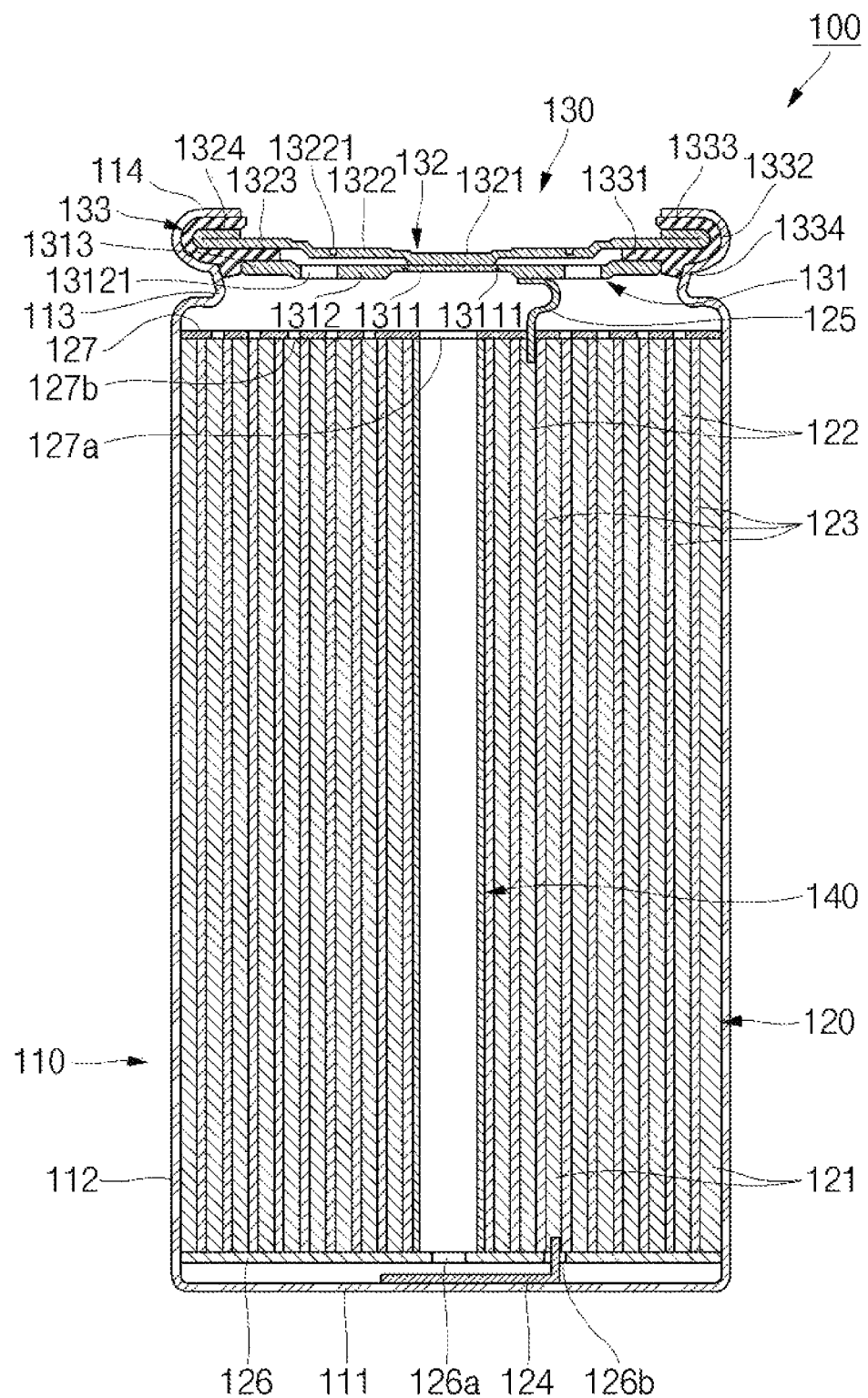

FIGS. 1A and 1B are a perspective view and a cross-sectional view, respectively, illustrating a secondary battery 100 according to an embodiment of the present disclosure.

As illustrated in FIGS. 1A and 1B, the secondary battery 100 according to an embodiment of the present disclosure may include: a cylindrical can, or case, 110; a cylindrical electrode assembly 120; and a current interrupt device 130. In one or more embodiments, the current interrupt device 130 may include a cap assembly, or may be referred to as a cap assembly.

In an embodiment, the cylindrical can 110 may include a bottom portion 111 having an approximately circular shape and a side wall 112 extending upward by a certain length from the bottom portion 111. During a manufacturing process of the secondary battery, an upper portion of the cylindrical can 110 is open. Thus, during the manufacturing process of the secondary battery, the electrode assembly 120 may be integrated in the form of a single structure and may be inserted into the cylindrical can 110. In an embodiment, subsequently, an electrolyte may optionally be additionally injected into the cylindrical can 110.

The cylindrical can 110 may be made of steel, a steel alloy, nickel-plated steel, a nickel-plated steel alloy, aluminum, an aluminum alloy, or an equivalent thereof, but the material thereof is not limited thereto. Further, to prevent or substantially prevent the current interrupt device 130 from being separated to the outside, the cylindrical can 110 may include: a beading part 113 recessed inward below the current interrupt device 130; and a crimping part 114 bent inward above the current interrupt device 130.

The electrode assembly 120 may be accommodated in the cylindrical can 110. The electrode assembly 120 may include: a negative electrode plate 121 coated with a negative electrode active material (e.g., graphite, carbon, etc.); a positive electrode plate 122 coated with a positive electrode active material (e.g., a transition metal oxide, such as $LiCoO_2$, $LiNiO_2$, $LiMn_2O_4$, etc.); and a separator 123 which is positioned between the negative electrode plate 121 and the positive electrode plate 122, and prevents or substantially prevents a short circuit and, in an embodiment, allows only lithium ions to move. The negative electrode plate 121, the positive electrode plate 122, and the separator 123 may be wound in an approximately cylindrical shape. In an embodiment, the negative electrode plate 121 may be copper (Cu) foil, the positive electrode plate 122 may be aluminum (Al) foil, and the separator 123 may be polyethylene (PE) or polypropylene (PP), but the materials are not limited thereto according to the present invention. In an embodiment, a negative electrode tab 124 protruding and extending a certain length downward may be welded to the negative electrode plate 121, and a positive electrode tab 125 protruding and extending a certain length upward may be welded to the positive electrode plate 122, or vice versa. In an embodiment, the negative electrode tab 124 may be copper (Cu) or nickel (Ni), and the positive electrode tab 125 may be aluminum (Al), but the materials are not limited thereto according to the present invention.

In an embodiment, the negative electrode tab 124 of the electrode assembly 120 may be welded to the bottom portion 111 of the cylindrical can 110. Thus, the cylindrical can 110 may operate as a negative electrode. However, in an embodiment, the positive electrode tab 125 may be welded to the bottom portion 111 of the cylindrical can 110, and, in this case, the cylindrical can 110 may operate as a positive electrode.

Further, a first insulating plate 126, which is coupled to the cylindrical can 110 and has a first hole 126a formed at a center thereof and a second hole 126b formed outside of the center, may be interposed between the electrode assembly 120 and the bottom portion 111. The first insulating plate 126 prevents or substantially prevents the electrode assembly 120 from coming into electrical contact with the bottom portion 111 of the cylindrical can 110. In particular, the first insulating plate 126 prevents or substantially prevents the positive electrode plate 122 of the electrode assembly 120 from coming into electrical contact with the bottom portion 111. Here, when a large amount of gas is produced due to abnormalities of the secondary battery 100, the first hole 126a allows the gas to rapidly move upward through a center pin 140. Also, the second hole 126b serves to allow the negative electrode tab 124 to pass therethrough and be welded to the bottom portion 111.

In an embodiment, a second insulating plate 127, which is coupled to the cylindrical can 110 and has a first hole 127a formed at a center thereof and a plurality of second holes 127b formed outside of the center, may be interposed between the electrode assembly 120 and the current interrupt device 130. The second insulating plate 127 prevents or substantially prevents the electrode assembly 120 from coming into electrical contact with the current interrupt device 130. In particular, the second insulating plate 127 prevents or substantially prevents the negative electrode plate 121 of the electrode assembly 120 from coming into electrical contact with the current interrupt device 130. In some examples, when a large amount of gas is produced due to abnormalities of the secondary battery 100, the first hole 127a allows the gas to rapidly move to the current interrupt device 130. Also, a second hole 127b allows the positive electrode tab 125 to pass therethrough and be welded to the current interrupt device 130, and the other second holes 127b allow an electrolyte to rapidly flow into the electrode assembly 120 during an electrolyte injection process.

In an embodiment, the first holes 126a and 127a of the respective first and second insulating plates 126 and 127 are formed to have diameters smaller than that of the center pin 140, and, thus, the center pin 140 is prevented or substantially prevented from coming into electrical contact with the bottom portion 111 of the cylindrical can 110 or the current interrupt device 130 due to external impact.

In an embodiment, the center pin 140, which may be optionally provided, has a hollow circular pipe shape and may be coupled to an approximately central region of the electrode assembly 120. In an embodiment, the center pin 140 may be made of steel, stainless steel, aluminum, an aluminum alloy, or polybutylene terephthalate, but a material thereof is not limited thereto. The center pin 140 may suppress deformation of the electrode assembly 120 during charging and discharging of a battery and also serves as a movement path for the gas generated inside the secondary battery 100.

In an embodiment, the current interrupt device 130 seals an opening of the can 110 to protect the electrode assembly 120 from an external environment, and interrupts the flow of current when a charging and discharging current is higher than a reference value. In some examples, the current interrupt device 130 may serve as a positive electrode terminal.

In an embodiment, the current interrupt device 130 may include a cap-down 131, a safety vent 132, and an insulating gasket 133.

The cap-down 131 may be electrically connected to the electrode assembly 120 via the positive electrode tab 125. In one or more embodiments, the cap-down 131 may include: an approximately flat first flat portion 1311; a second flat portion 1312 which extends from the first flat portion 1311 and has a thickness greater than that of the first flat portion 1311; and a third flat portion 1313 which is bent upward from the second flat portion 1312 and then extends. In one or more embodiments, the first flat portion 1311 may include a vent groove 13111 which is formed on a lower surface of the first flat portion 1311 to a certain depth. In one or more embodiments, an upper surface of the first flat portion 1311 may be ultrasonic and/or laser welded to the safety vent 132. In one or more embodiments, a lower surface of the second flat portion 1312 may be ultrasonic and/or laser welded to the positive electrode tab 125. In one or more embodiments, the second flat portion 1312 may include a plurality of through-holes 13121. The through-holes 13121 allow internal pressure or internal gas to be rapidly delivered to the safety vent 132 when the internal pressure of the secondary battery 100 rises. In an embodiment, the cap-down 131 may be made of aluminum or an aluminum alloy.

The safety vent 132 may be positioned above the cap-down 131. In one or more embodiments, the safety vent 132 may include: an approximately flat first flat portion 1321; an approximately flat second flat portion 1322 which is bent upward from the first flat portion 1321 and then extends; an approximately flat third flat portion 1323 which is bent upward from the second flat portion 1322 and then extends; and a fourth flat portion 1324 which is bent approximately 180 degrees from the third flat portion 1323 and extends. In one or more embodiments, the thickness of the first flat portion 1321 may be greater than the thicknesses of the second, third, and fourth flat portions 1322, 1323, and 1324, and a lower surface of the first flat portion 1321 may be ultrasonic and/or laser welded to the cap-down 131. In one or more embodiments, the second flat portion 1322 may further include a vent groove 13221 which is formed on an upper surface of the second flat portion 1322 to a certain depth.

Accordingly, when an internal pressure of the secondary battery 100 becomes greater than a reference pressure, the vent groove 13111 of the cap-down 131 and the vent groove 13221 of the safety vent 132 are ruptured, and the internal pressure or internal gas can be discharged to the outside. Thus, safety of the secondary battery 100 can be ensured or improved.

In one or more embodiments, a lower surface of the fourth flat portion 1324 may be in close contact with an upper surface of the third flat portion 1323. In an embodiment, the safety vent 132 may be made of aluminum or an aluminum alloy. In one or more embodiments, the second and third flat portions 1322 and 1323 of the safety vent 132 may be spaced apart from the second and third flat portions 1312 and 1313 of the cap-down 131.

The insulating gasket 133 is interposed between the cap-down 131 and the safety vent 132 and may cover outer circumferences of the cap-down 131 and the safety vent 132. In one or more embodiments, the insulating gasket 133 may include an interposer, or interposing portion, 1331, an upward extension portion 1332, an upper horizontal portion 1333, and a downward extension portion 1334.

The interposer 1331 may be interposed between an upper surface of the cap-down 131 and a lower surface of the safety vent 132. In one or more embodiments, the interposer 1331 may be interposed between the third flat portion 1313 of the cap-down 131 and the third flat portion 1323 of the safety vent 132.

The upward extension portion 1332 may extend from the interposer 1331 and cover the outer circumference of the safety vent 132. In one or more embodiments, the upward extension portion 1332 may cover outer circumferences of the third flat portion 1323 and the fourth flat portion 1324 of the safety vent 132.

thickness of the insulating gasket 133 may not be changed before/after the crosslinking, and a heat deflection temperature or heat distortion temperature (HDT) may be about 400° C. to about 600° C. Substantially, the insulating gasket 133 according to one or more embodiments of the present disclosure is not thermally deformed within a temperature range from about 400° C. to about 600° C.

In an example, when a polyethylene insulating gasket sheet is injection-molded and then naturally cross-linked at a room temperature, a change in thickness (unit: mm) before/after the crosslinking is examined as in Table 1 below. Here, each of 1 to 10 in the vertical axis represents a sample number, and each of 1 to 4 in the horizontal axis represents a number of test.

TABLE 1

|  | 1 | | 2 | | 3 | | 4 | |
| --- | --- | --- | --- | --- | --- | --- | --- | --- |
|  | Before | After 10 days | Before | After 10 days | Before | After 10 days | Before | After 10 days |
| 1 | 0.439 | 0.435 | 0.439 | 0.433 | 0.440 | 0.433 | 0.436 | 0.434 |
| 2 | 0.437 | 0.434 | 0.440 | 0.435 | 0.440 | 0.435 | 0.438 | 0.435 |
| 3 | 0.436 | 0.435 | 0.441 | 0.434 | 0.436 | 0.433 | 0.436 | 0.434 |
| 4 | 0.436 | 0.434 | 0.439 | 0.432 | 0.436 | 0.434 | 0.438 | 0.432 |
| 5 | 0.436 | 0.435 | 0.439 | 0.435 | 0.437 | 0.432 | 0.437 | 0.434 |
| 6 | 0.437 | 0.436 | 0.439 | 0.433 | 0.437 | 0.434 | 0.437 | 0.435 |
| 7 | 0.441 | 0.436 | 0.440 | 0.434 | 0.439 | 0.432 | 0.438 | 0.434 |
| 8 | 0.436 | 0.437 | 0.439 | 0.433 | 0.439 | 0.433 | 0.436 | 0.435 |
| 9 | 0.437 | 0.438 | 0.440 | 0.432 | 0.439 | 0.435 | 0.439 | 0.434 |
| 10 | 0.436 | 0.436 | 0.442 | 0.433 | 0.439 | 0.434 | 0.437 | 0.436 |
| AVG | 0.437 | 0.436 | 0.440 | 0.433 | 0.438 | 0.434 | 0.437 | 0.434 |
| MIN | 0.436 | 0.434 | 0.439 | 0.432 | 0.436 | 0.432 | 0.436 | 0.432 |
| MAX | 0.441 | 0.438 | 0.442 | 0.435 | 0.440 | 0.435 | 0.439 | 0.436 |
| STDEV | 0.002 | 0.001 | 0.001 | 0.001 | 0.002 | 0.001 | 0.001 | 0.001 |
| Difference between before and after | | 0.001 | | 0.006 | | 0.005 | | 0.003 |

The upper horizontal portion 1333 may extend from the upward extension portion 1332 and cover an upper surface of the safety vent 132. In one or more embodiments, the upper horizontal portion 1333 may cover the fourth flat portion 1324 of the safety vent 132. In one or more embodiments, the upward extension portion 1332 and the upper horizontal portion 1333 may be in close contact with the crimping part 114 of the can 110 and supported thereby.

The lower extension portion 1334 may extend from the interposer 1331 and cover an outer circumference of the cap-down 131. In one or more embodiments, the width of the downward extension portion 1334 may be equal or similar to a thickness of the interposer 1331. In one or more embodiments, the downward extension portion 1334 may be in close contact with the beading part 113 of the can 110 and supported thereby.

In an embodiment, the interposer 1331, the upward extension portion 1332, the upper horizontal portion 1333, and the downward extension portion 1334, all of which constitute the insulating gasket 133, may be provided by injection molding polymer resin. In an embodiment, the interposer 1331, the upward extension portion 1332, the upper horizontal portion 1333, and the downward extension portion 1334 may be integrated into a single body.

In one or more embodiments, the insulating gasket 133 may include polyethylene which is injection-molded and then naturally cross-linked at a room temperature (about 1° C. to about 35° C.). In one or more embodiments, the As shown in Table 1, a change in thickness of a polyethylene insulating gasket sheet before/after (10 days) crosslinking is about 0.001 mm to 0.006 mm, and thus it can be seen that there is almost no change in thickness. Also, when a polyethylene insulating gasket is cut from an injection-molded sheet (a slitting process), there is almost no change in shape due to the slitting.

In addition, results of the heat resistance test for the polyethylene insulating gasket sheet are shown in Table 2 below. Here, #1 (Sep. 18, 2020) and #2 (Sep. 21, 2020) represent test start dates, and 1 to 10 represent sample numbers. Also, the polyethylene insulating gasket sheet had been placed on a hot plate of 470° C. under a test condition such as for 90 seconds. Subsequently, the gasket sheet was brought out from the hot plate, and a change in thickness (unit: mm) was measured.

TABLE 2

|  | #1 | | #2 | |
| --- | --- | --- | --- | --- |
| Product number | Before | After | Before | After |
| 1 | 3.48 | 3.38 | 3.47 | 3.38 |
| 2 | 3.46 | 3.36 | 3.48 | 3.39 |
| 3 | 3.47 | 3.37 | 3.46 | 3.36 |
| 4 | 3.46 | 3.35 | 3.47 | 3.38 |
| 5 | 3.46 | 3.34 | 3.47 | 3.39 |
| 6 | 3.47 | 3.38 | 3.47 | 3.36 |
| 7 | 3.48 | 3.37 | 3.48 | 3.35 |
| 8 | 3.48 | 3.37 | 3.46 | 3.38 |

TABLE 2-continued

| | #1 | | #2 | |
|---|---|---|---|---|
| Product number | Before | After | Before | After |
| 9 | 3.47 | 3.37 | 3.48 | 3.39 |
| 10 | 3.47 | 3.36 | 3.47 | 3.38 |
| AVG | 3.47 | 3.37 | 3.47 | 3.38 |
| MIN | 3.46 | 3.34 | 3.46 | 3.35 |
| MAX | 3.48 | 3.38 | 3.48 | 3.39 |
| STDEV | 0.01 | 0.01 | 0.01 | 0.01 |
| Difference in AVGs of thicknesses between before and after | | −0.11 | | −0.10 |

As shown in Table 2, regarding the polyethylene insulating gasket sheet manufactured through the natural crosslinking process according to the present disclosure, it can be seen that the thickness thereof is reduced in an amount of about 0.1 mm to about 0.11 mm at about 470° C. That is, it can be seen that the naturally cross-linked polyethylene insulating gasket according to the present disclosure has a very small thermal strain rate at high temperature. Thus, when the naturally cross-linked polyethylene insulating gasket is used as a component of the current interrupt device in the secondary battery, it is possible to prevent or substantially prevent a direct short circuit between the can and the safety vent because the component is not melted at high temperature. Also, the naturally cross-linked polyethylene insulating gasket is not contracted in the inward direction and/or in the outward direction, and, thus, sealing strength of the secondary battery is not deteriorated. For reference, according to the related art, polyethylene is thermally deformed at about 200° C., and, thus, a can was directly electrically short-circuited with a safety vent. Also, a gasket was contracted over time, and, thus, sealing strength of a secondary battery was deteriorated.

Also, an electron beam crosslinking process may also be utilized in addition to the natural crosslinking process. In some examples, only the electron-beam crosslinking process may be utilized instead of the natural crosslinking process.

Figure 2:
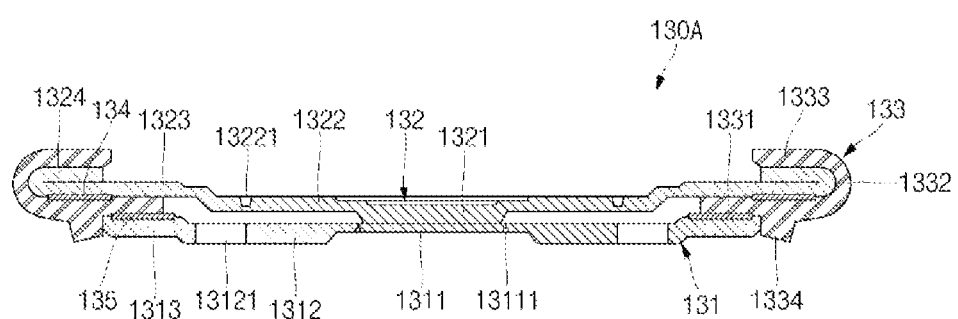
FIG. 2 is an enlarged cross-sectional view illustrating a current interrupt device of a secondary battery according to an embodiment of the present disclosure.

FIG. 2 is an enlarged cross-sectional view illustrating a current interrupt device 130A of a secondary battery according to an embodiment of the present disclosure. In an example illustrated in FIG. 2, the current interrupt device 130A according to an embodiment of the present disclosure may further include: an upper tar-coated layer 134 interposed between an upper surface of an interposer 1331 and a lower surface of a safety vent 132; and a lower tar-coated layer 135 interposed between a lower surface of the interposer 1331 and an upper surface of a cap-down 131.

In one or more embodiments, the upper tar-coated layer 134 may be interposed between the upper surface of the interposer 1331 and a third flat portion 1323 of the safety vent 132. In one or more embodiments, the lower tar-coated layer 135 may be interposed between the lower surface of the interposer 1331 and a third flat portion 1313 of the cap-down 131.

In one or more embodiments, the upper tar-coated layer 134 and/or the lower tar-coated layer 135 can prevent or substantially prevent not only contraction of an insulating gasket 133 but corrosion of the safety vent 132 and/or the cap-down 131. Thus, a sealing strength of the secondary battery may be further enhanced by the upper tar-coated layer 134 and/or the lower tar-coated layer 135. In one or more embodiments, an acryl-based adhesive and/or a rubber-based adhesive may be further provided on the surfaces of the tar-coated layers 134 and 135, and, thus, the sealing strength of the secondary battery may be even further enhanced.

Figure 3:
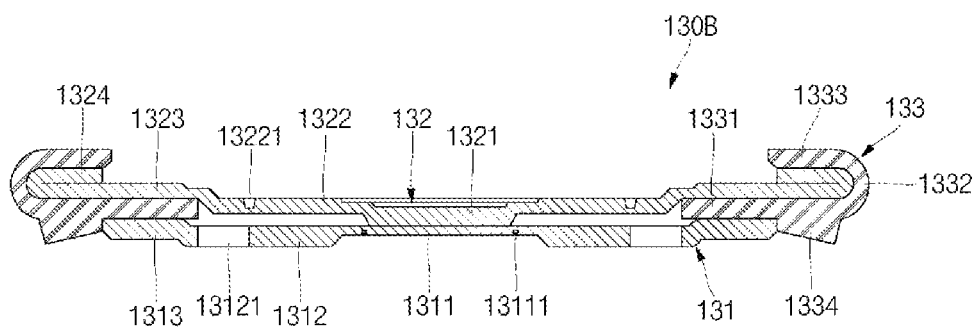
FIG. 3 is an enlarged cross-sectional view illustrating a current interrupt device of a secondary battery according to an embodiment of the present disclosure.

FIG. 3 is an enlarged cross-sectional view illustrating a current interrupt device 130B of a secondary battery according to an embodiment of the present disclosure. As illustrated in FIG. 3, in the current interrupt device 130B according to an embodiment of the present disclosure, an interposer 1331 may be in close contact with an entire lower surface of a third flat portion 1323 of a safety vent 132 and may be in close contact with an entire upper surface of a third flat portion 1313 of a cap-down 131. In one or more embodiments, a width of a downward extension portion 1334 of an insulating gasket 133 may be greater than a thickness of the interposer 1331.

Accordingly, in the current interrupt device 130B according to an embodiment of the present disclosure, an insulating function between the cap-down 131 and the safety vent 132 and an insulating function between a can 110 and the cap-down 131 may be enhanced due to the relatively wider interposer 1331 and downward extension portion 1334, and component deformation rates may also be lowered.

Embodiments of the present disclosure may provide a secondary battery capable of: preventing or substantially preventing leakage of an electrolyte while simplifying the structure of the current interrupt device; preventing or substantially preventing deformation of the current interrupt device; and preventing or substantially preventing a short circuit between the can and the current interrupt device due to a high heat deflection temperature.

While one or more embodiments have described herein for achieving a secondary battery according to the present invention, the present invention is not limited thereto, and the technical scope and spirit of the present invention include all ranges of technologies that may be variously modified by those of ordinary skill in the art, to which the present invention pertains, without departing from the subject matter of the present invention as set forth in the following claims.

What is claimed is:

1. A secondary battery comprising:
   a cylindrical case;
   an electrode assembly accommodated in the cylindrical case and wound in a cylindrical shape; and
   a current interrupt device electrically connected to the electrode assembly and sealing the cylindrical case,
   wherein the current interrupt device comprises a cap-down electrically connected to the electrode assembly, a safety vent electrically connected to the cap-down, and an insulating gasket between the cap-down and the safety vent and covering outer circumferences of the cap-down and the safety vent, wherein the safety vent comprises: a first flat portion; a second flat portion which is bent upward from the first flat portion and extends; a third flat portion which is bent upward from the second flat portion and extends; and a fourth flat portion which is bent 180 degrees from the third flat portion and extends, the first to fourth flat portions extend parallel to one another, and a lower surface of the fourth flat portion directly contacts an upper surface of the third flat portion.

2. The secondary battery of claim 1, wherein the insulating gasket comprises:

an interposing portion between the cap-down and the safety vent;

an upward extension portion extending from the interposing portion and covering the outer circumference of the safety vent;

an upper horizontal portion extending from the upward extension portion and covering an upper surface of the safety vent; and a downward extension portion extending from the interposing portion and covering the outer circumference of the cap-down.

3. The secondary battery of claim 2, wherein the safety vent comprises a first flat portion, a second flat portion extending from the first flat portion, and a third flat portion extending from the second flat portion, wherein the interposing portion is in close contact with an entire lower surface of the third flat portion.

4. The secondary battery of claim 2, wherein a width of the downward extension portion is greater than a thickness of the interposing portion.

5. The secondary battery of claim 2, further comprising an upper tar-coated layer between an upper surface of the interposing portion and a lower surface of the safety vent, and a lower tar-coated layer between a lower surface of the interposing portion and an upper surface of the cap-down.

6. The secondary battery of claim 1, wherein the insulating gasket comprises polyethylene which is naturally crosslinked at a temperature of about 1° C. to about 35° C.

7. The secondary battery of claim 6, wherein a thickness of the insulating gasket is not changed before and after the crosslinking.

8. The secondary battery of claim 1, wherein the insulating gasket comprises polyethylene and has a heat deflection temperature of about 400° C. to about 600° C.

9. The secondary battery of claim 1, wherein the safety vent defines an outermost surface of the secondary battery so as to function as an external terminal of the secondary battery.

10. The secondary battery of claim 1, wherein the cap-down comprises a plurality of through holes configured to pass an internal gas of the secondary battery to the safety vent.

* * * * *